United States Patent [19]

Kanai

[11] Patent Number: 4,970,603
[45] Date of Patent: Nov. 13, 1990

[54] FACSIMILE COMMUNICATION SYSTEM

[75] Inventor: Hiroshi Kanai, Atsugi, Japan

[73] Assignee: Hitachi, Ltd., Tokyo, Japan

[21] Appl. No.: 128,691

[22] Filed: Dec. 4, 1987

[30] Foreign Application Priority Data

Dec. 9, 1986 [JP] Japan .................. 61-293056

[51] Int. Cl.$^5$ .............................................. H04N 1/00
[52] U.S. Cl. ................................... 358/400; 358/401; 358/434
[58] Field of Search ............... 358/256, 280, 287, 257, 358/400, 401, 402, 403, 404, 405, 406, 407, 434, 435, 436, 438, 439; 379/100

[56] References Cited

U.S. PATENT DOCUMENTS

| 3,920,896 | 11/1975 | Bishop | 379/100 |
|---|---|---|---|
| 3,958,088 | 5/1976 | Vieri . | |
| 4,058,672 | 11/1977 | Grager | 358/257 |
| 4,058,838 | 11/1977 | Crager | 358/257 |
| 4,491,873 | 1/1985 | Takayama | 358/256 |
| 4,533,958 | 8/1985 | Herget | 358/280 |
| 4,644,409 | 2/1987 | Fuchs | 358/287 |
| 4,876,604 | 10/1989 | Nobuta | 358/400 |

FOREIGN PATENT DOCUMENTS 62-204654 9/1987 Japan .

OTHER PUBLICATIONS

"Separate System for Facsimile Communication", Study of International Communication, No. 128, Apr. 1986, pp. 75-79-published by KDD.

Primary Examiner—Edward L. Coles, Sr.
Assistant Examiner—Jerome Grant, II
Attorney, Agent, or Firm—Antonelli, Terry, Stout & Kraus

[57] ABSTRACT

A facsimile communication system for communicating picture data among facsimile machines including two types of facsimile machines having different coding algorithms for picture data and different resolutions. One type of facsimile machine is directly connected to a store and forward switching network and the other type of facsimile machine is connected to the store and forward switching network through a facsimile terminal controller. When the facsimile terminal controller receives picture data from the other type of facsimile machine, it decodes the received picture data, encodes it by the coding algorithm of the first type of facsimile machine and sends it to the store and forward switching network. When the facsimile terminal controller receives the picture data from the store and forward switching network, it decodes the received picture data, encodes it by the coding algorithm of the other type of facsimile machine and sends it to the other type of facsimile machine. When a resolution of the image data received from the store and forward switching network is different from a resolution of the picture data to be sent to the other type of facsimile machine or vice versa, the facsimile terminal controller converts the image data to the appropriate resolution.

12 Claims, 8 Drawing Sheets

FIG. 1

DIFFERENCES BETWEEN G3 AND G4 FACSIMILE MACHINES

| ITEM NO. | MACHINE TYPE / ITEM | TELEPHONE NETWORK FACSIMILE — G3 MACHINE | DATA NETWORK FACSIMILE — G4 MACHINE |
|---|---|---|---|
| 1 | CONNECTION CONTROL TECHNIQUE | TELEPHONE NETWORK SIGNAL SYSTEM | DATA NETWORK SIGNAL SYSTEM (X.21, X.25) |
| 2 | TERMINAL CONTROL SYSTEM | T.30 BINARY PROTOCOL | TELEMATIC TERMINAL CONTROL PROTOCOL (T.73, T.70, T.62) |
| 3 | FACSIMILE SIGNAL FORM | DIGITAL | DIGITAL |
| 4 | MODULATION TECHNIQUE | 8-PSK (V.27 ter) OR OAM (V.29) | MODULATION TECHNIQUE DETERMINED BY NETWORK |
| 5 | TRANSMISSION RATE | 300 bps (CONTROL SIGNAL) 2400, 4800, 7200, 9600 bps (FAX SIGNAL) | 2.4, 4.8, 9.6-48 Kbps (64 Kbps PERMITTED FOR ISDN) |
| 6 | REDUNDANCY COMPRESSION (CODING TECHNIQUE) | 1 DIMENSION: MH SYSTEM 2 DIMENSION: MR (K=2 OR 4) SYSTEM | 2 DIMENSION MR (MMR) SYSTEM |
| 7 | TRANSMISSION ERROR CONTROL | CONTROL SIGNAL: RETRANSMISSION CORRECTION FAX SIGNAL: NO ERROR CORRECTION FUNCTION | HDLC RETRANSMISSION CORRECTION |
| 8 | FRAME CONFIGURATION | FRAME CONFIGURATION FOR ONLY CONTROL SIGNAL: NO FRAME CONFIGURATION FOR FAX SIGNAL | HDLC FRAME |
| 9 | RESOLUTION | MAIN SCAN: 8 pel/mm SUB-SCAN: 3.85, 7.7 ℓ/mm | MAIN/SUB-SCAN (SQUARE RESOLUTION) 200, 240, 300, 400 pels/mm |
| 10 | LINE SYNC SIGNAL | EOL SIGNAL | NOT USED |
| 11 | ONE-LINE TRANSMISSION TIME | DEPENDS ON DEGREE OF DATA COMPRESSION SETTABLE TO 0, 5, 10, 20, 40 ms MINIMUM | DEPENDS ON DEGREE OF DATA COMPRESSION |

F I G. 2
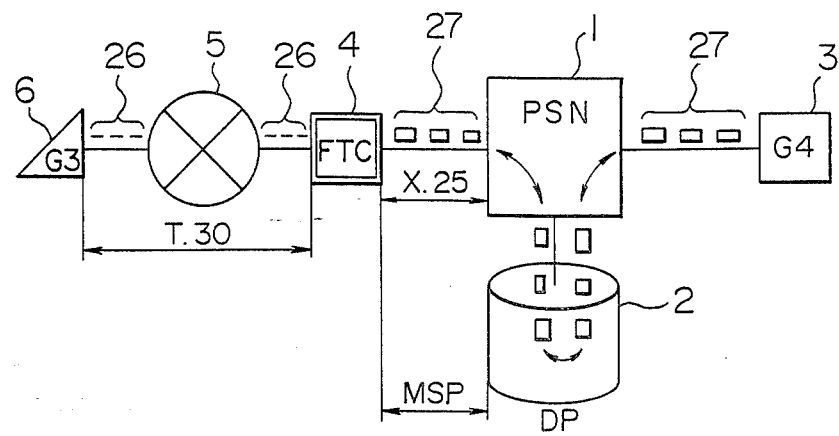
F I G. 3
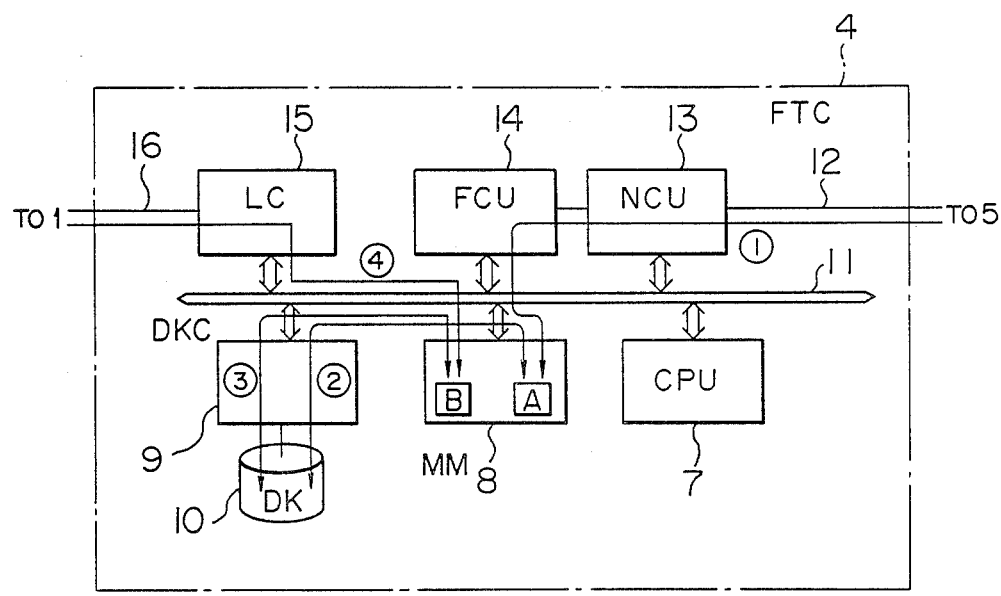

F I G. 7

| RECEIVING TERMINAL ATTRIBUTES \ SENDING TERMINAL ATTRIBUTES | G3 FACSIMILE MH | G3 FACSIMILE MR | G4 FACSIMILE MMR |
|---|---|---|---|
| G3 FACSIMILE MH | (C) / (A) | (D) / (A) | — / (A) |
| G3 FACSIMILE MR | (C) / (B) | (D) / (B) | — / (B) |
| G4 FACSIMILE MMR | (C) / — | (D) / — | — / — |

[PROCESS]

(A)  MH ⟶ MMR (B)  MR ⟶ MMR (C)  MMR ⟶ MH (D)  MMR ⟶ MR (—)  NOT APPLICABLE

FIG. 8

| SENDING TERMINAL ATTRIBUTES \ RECEIVING TERMINAL ATTRIBUTES | | G3 FAX | | G4 FAX (Pels/25.4mm) |
|---|---|---|---|---|
| | | MAIN SCAN DIR 8P/mm SUB-SCAN DIR 3.85 ℓ/mm (G3 STANDARD) | MAIN SCAN DIR 8P/mm SUB-SCAN DIR 7.7 ℓ/mm | 200 (G4 STANDARD) |
| G3 FAX | MAIN SCAN DIR 8P/mm SUB-SCAN DIR 3.85 ℓ/mm (G3 STANDARD) | (C) / (A) | (G) / (A) | — / (A) |
| | MAIN SCAN DIR 8P/mm SUB-SCAN DIR 7.7 ℓ/mm | (C) / (B) | (G) / (B) | — / (B) |
| G4 FAX (Pels/25.4mm) | 200 (G4 STANDARD) | (C) / — | (G) / — | — / — |
| | 240 | (D) / — | (H) / — | — / — |
| | 300 | (E) / — | (I) / — | — / — |
| | 400 | (F) / — | (J) / — | — / — |

FIG. 9

| ITEM NO. | RESOLUTION | SIZE A4 | SIZE B4 | RATIO |
|---|---|---|---|---|
| 1 | G3 8 P/mm | 1728 | 2048 | 1 |
| 2 | G4 200 Peℓ/25.4mm | 1728 | 2048 | 1 |
| 3 | G4 240 Peℓ/25.4mm | 2074 | 2458 | 1.2 |
| 4 | G4 300 Peℓ/25.4mm | 2592 | 3072 | 1.5 |
| 5 | G4 400 Peℓ/25.4mm | 3456 | 4096 | 2 |
| 6 | DOCUMENT SHEET WIDTH (mm) | 210 | 250 | |

FIG. 10

| ITEM NO. | RESOLUTION | ℓ/mm | RATIO * |
|---|---|---|---|
| 1 | G3 3.85 ℓ/mm | 3.85 | 0.5 |
| 2 | G3 7.7 ℓ/mm | 7.7 | 1 |
| 3 | G4 200 Peℓ/25.4mm | 7.874 | 1 |
| 4 | G4 240 Peℓ/25.4mm | 9.449 | 1.2 |
| 5 | G4 300 Peℓ/25.4mm | 11.811 | 1.5 |
| 6 | G4 400 Peℓ/25.4mm | 15.748 | 2 |

\* 7.7 ℓ/mm IS USED AS REFERENCE ; RATIOS FOR 7.7 AND 7.874 ARE 1 BECAUSE ERROR IS 2%

FIG. 11

| SYMBOL | SCAN DIR / DOCUMENT | SIZE A4 | SIZE B4 | NOTE |
|---|---|---|---|---|
| (A) | MAIN | NO CHANGE | NO CHANGE | FROM 8p/mm 3.85ℓ/mm |
| (A) | SUB | 1ℓ → 2ℓ | SAME AS A4 | |
| (B) | MAIN | NO CHANGE | NO CHANGE | FROM 8p/mm 27ℓ/mm |
| (B) | SUB | NO CHANGE | NO CHANGE | |
| (C) | MAIN | NO CHANGE | NO CHANGE | To 8p/mm 3.85ℓ/mm |
| (C) | SUB | 2ℓ → 1ℓ | SAME AS A4 | |
| (D) | MAIN | 2074 → 1728 | 2458 → 2048 | |
| (D) | SUB | 12ℓ → 5ℓ | SAME AS A4 | |
| (E) | MAIN | 2592 → 1728 | 3072 → 2048 | |
| (E) | SUB | 3ℓ → 1ℓ | SAME AS A4 | |
| (F) | MAIN | 3456 → 1728 | 4096 → 2048 | |
| (F) | SUB | 4ℓ → 1ℓ | SAME AS A4 | |
| (G) | MAIN | NO CHANGE | NO CHANGE | To 8p/mm 7.7ℓ/mm |
| (G) | SUB | NO CHANGE | NO CHANGE | |
| (H) | MAIN | SAME AS (D) | SAME AS (D) | |
| (H) | SUB | 6ℓ → 5ℓ | SAME AS A4 | |
| (I) | MAIN | SAME AS (E) | SAME AS (E) | |
| (I) | SUB | 3ℓ → 2ℓ | SAME AS A4 | |
| (J) | MAIN | SAME AS (F) | SAME AS (F) | |
| (J) | SUB | 2ℓ → 1ℓ | SAME AS A4 | |

FACSIMILE COMMUNICATION SYSTEM

BACKGROUND OF THE INVENTION

The present invention relates to a facsimile communication system, and more particularly to a facsimile communication system suitable for a circumstance where different types of facsimile machines are used in a store and forward switching network such as a packet switching network.

In a conventional facsimile communication system which uses a store and forward switching network such as a packet switching network, a G3 facsimile machine cannot be directly connected to the packet switching network. As is know, packet switching is a data transmission process utilizing addressed packets whereby a channel is occupied only for the duration of transmission of the packet. A packet is a group of binary digits including data and control elements which is switched and transmitted as a composite whole. A G3 facsimile machine cannot receive data directly from a packet switching network. In order for a G3 facsimile machine to make use of the data in a packet the packet must be disassembled to its original form. Also, in order for a G3 facsimile machine to transmit data over a packet switching network, the data must be assembled into packets with the appropriate control and data elements. Such packet assembly and disassembly functions are performed by a device known in the art as a Packet Assemble and Disassembly (PAD) device. As shown in an article "Separate System for Facsimile Communication", STUDY OF INTERNATIONAL COMMUNICATION, No. 128, April 1986, pp 73–79, published by Kokusai Denshin Denwa Co. Ltd., a G3 facsimile packet assembly and disassembly (PAD) device is provided between the G3 facsimile machine and the packet switching network (G3 facsimile communication system). A standard specification of a G4 facsimile machine was recommended in 1984 by CCITT as T.5 and T.6. This G4 facsimile machine can be directly connected to the store and forward switching network such as packet switching network.

The G3 facsimile machine and the G4 facsimile machine have different design philosophies and there are many differences between them as shown in FIG. 1. In order for the G3 facsimile machine and the G4 facsimile machine to communicate with each other through the store and forward switching network, it is necessary to absorb in the system all differences shown in FIG. 1 except for the facsimile signal form in item 3. The conversions of communication control system, terminal control system, modulation technique, transmission rate, transmission error control, frame configuration and one-line transmission time of the items 1, 2, 4, 5, 7, 8 and 11 can be attained in the facsimile PAD device, but the conversions of redundancy compression, resolution and line synchronization signal of the items 6, 9 and 10 cannot be attained in the PAD device. Thus, the prior art network pays no attention to the circumstance where the G3 facsimile machines and the G4 facsimile machines are mixedly connected to the store and forward switching network, and even if a G4 facsimile machine is connected to the store and forward switcher, the G3 facsimile machine and the G4 facsimile machine cannot communicate with each other.

In order to solve those problems, it has been proposed to absorb the differences shown in FIG. 1 in the store and forward switching network, but the store and forward switcher must communicate with a different protocol depending on whether the machine is a G3 facsimile machine or a G4 facsimile machine, and hence the control is complex. Since the facsimile machine handles a large volume of data, a load is heavy in encoding algorithm conversion or resolution conversion, and a throughput of the system is lowered because of a limitation to a processing performance of the store and forward switcher. Such a problem usually occurs in mutual communication between different types of facsimile machines.

SUMMARY OF THE INVENTION

It is an object of the present invention to provide a facsimile communication apparatus which allows mutual communication between different types of facsimile machines and in which each facsimile machine transmits and receives signals without recognizing the type of the partner facsimile machine and a store and forward switcher communicates with apparatuses connected thereto using only one protocol.

In the facsimile communication system of the present invention, one of two different types of facsimile machines which may have different picture data encoding algorithms and different resolutions is directly connected to the store and forward switching network and the other type of facsimile machine is connected to the store and forward switching network through a facsimile terminal controller, which decodes the encoded picture data sent from the other type of facsimile machine, encodes it with the encoding algorithm of the one type of facsimile machine and sends it to the storage switching network. The facsimile terminal controller handles the encoded picture data supplied from the store and forward switching network in the opposite manner. Namely, it encodes the decoded data with the encoding algorithm of the other type of facsimile machine and sends it to that facsimile machine. When the resolution of the picture data received from the store and forward switching network is different from the resolution of the picture data to be sent to the other type of facsimile machine, the resolution is converted. The facsimile terminal controller uses the same protocol as that which the one type of facsimile machine uses when it transmits and receives the picture data, when the picture data is transmitted and received to and from the store and forward switching network.

In the present facsimile communication system, each of different types of facsimile machines can transmit and receive signals without recognizing the type of partner facsimile machine, and the store and forward switching network need to follow only the protocol of the one type of facsimile machine.

In one embodiment of the present invention in which a G3 facsimile machine and a G4 facsimile machine communicate with each other, the G4 facsimile machine is directly connected to a store and forward switching network, the G3 facsimile machine is connected to the store and forward switching network through a facsimile terminal controller, and the facsimile terminal controller is provided with a PAD function as well as a picture data encode/decode function for mutual conversion of picture data of the G3 facsimile machine and the G4 facsimile machine, and a resolution conversion function. The resolution conversion is made by converting the number of dots per line in the main scan direction, that is in the direction of line, and by converting number of lines in the sub-scan direction perpendicular to the main scan direction. The facsimile terminal controller connected between the G3 facsimile machine and the store and forward switching network operates in the following manner.

When the facsimile terminal controller receives the picture data from the G3 facsimile machine, it converts the attributes of the received picture data (items 6, 9 and 10 of the G3 facsimile machine of FIG. 1) to the attributes of the items 6, 9 and 10 of the G4 facsimile machine by the picture data decode function and the picture data encode function, stores one sheet of picture data in a memory, and then sends it to a store and forward switching network. When the picture data is to be sent to the G3 facsimile machine, the controller stores the picture data received from the store and forward switching network (and having the attributes of the items 6, 9 and 10 of the G4 facsimile machine of FIG. 1 for both the document sent from the G3 facsimile machine and the document sent from the G4 facsimile machine) into the memory, recognizes the attributes of the G3 facsimile machine in accordance with the procedures of the G3 facsimile machine and the CCITT Recommendation T.30, and converts the picture data to a picture data having the attributes of the items 6, 9 and 10 of the G3 facsimile machine of FIG. 1 by using the picture data decoding function, the number of dots per line conversion function and the picture data encoding function. The packet assembly and disassembly are basically identical to those of the conventional facsimile PAD device.

In this manner, the G3 facsimile machine and the G4 facsimile machine can communicate with each other without recognizing the type of the partner facsimile machine. Since the facsimile terminal controller, the store and forward switching network and the G4 facsimile machine are connected through the G4 mode protocol, the control in the store and forward switcher is simple and the load is reduced.

BRIEF DESCRIPTION OF THE DRAWINGS

These and other objects and advantages of the present invention will become apparent by reference to the following description and accompanying drawings wherein:

FIG. 1 shows differences of attributes of a G3 facsimile machine and a G4 facsimile machine, FIG. 2 shows a configuration of one embodiment of a facsimile communication system of the present invention, FIG. 3 shows a block diagram of one embodiment of a facsimile terminal controller of FIG. 2, FIG. 7 shows an encoding algorithm conversion pattern, FIG. 8 shows a resolution conversion pattern, FIG. 9 shows the number of pixels and a ratio in a main scan direction, FIG. 10 shows the number of scan lines and a ratio in a sub-scan direction, and FIG. 11 shows a content of resolution conversion by the facsimile control unit.

DESCRIPTION OF THE PREFERRED EMBODIMENTS

Figure 4:
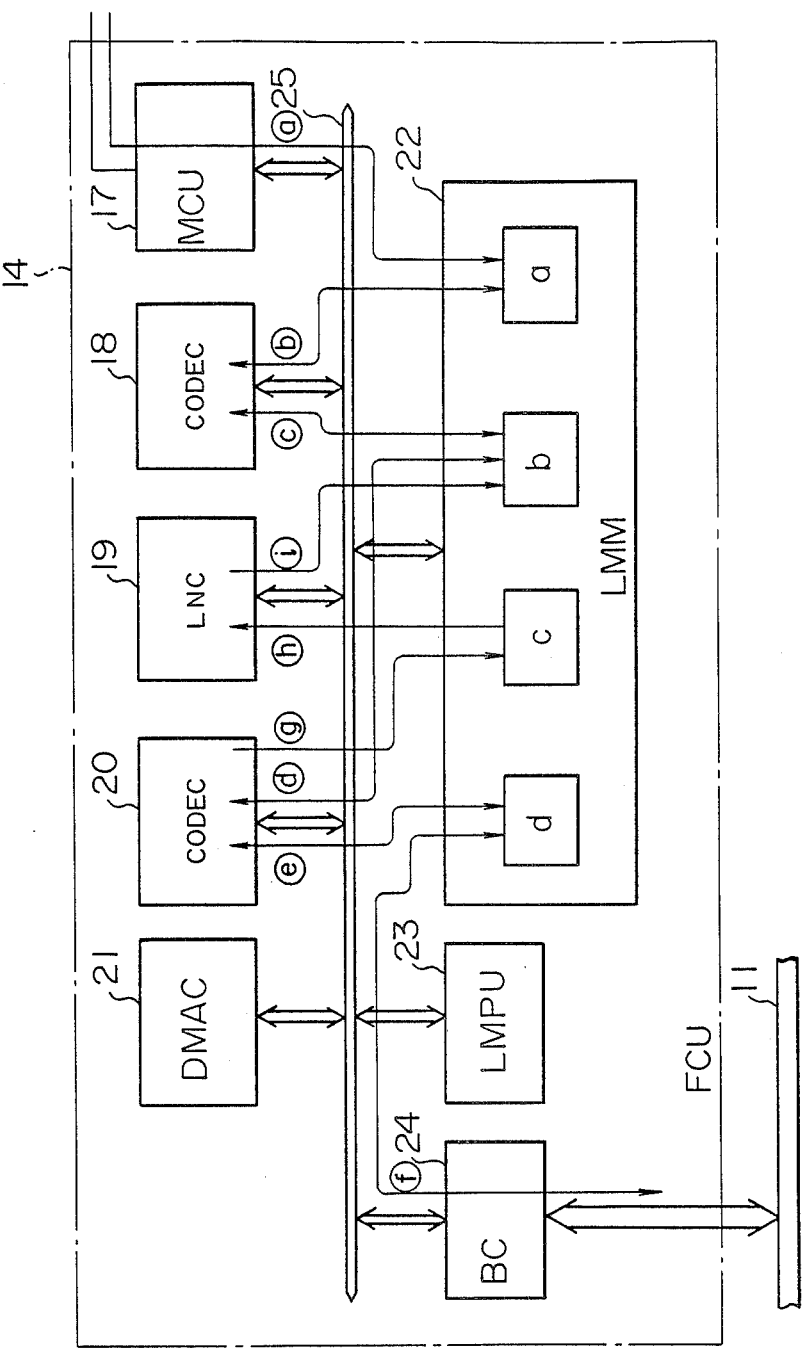
FIG. 4 shows a configuration of a facsimile control unit in FIG. 3.

One embodiment of the present invention will now be explained with reference to the drawings.

FIG. 2 shows a configuration of an embodiment of the facsimile store and forward switching system of the present invention. In the present embodiment, facsimile communication is made in a network in which G3 facsimile machines and G4 facsimile machines coexist. In FIG. 2, a G3 facsimile machine 6 is connected to a facsimile terminal controller (FTC) 4 having a facsimile PAD function and an image data conversion function, through a telephone switching network 5. The FTC 4 is connected to a store and forward switcher (DP) 2 through a packet switching network (PSN) 1. A G4 facsimile machine 3 is also connected to the. DP 2 through the PSN 1. The communication protocol between the FTC 4 and the G3 facsimile machine 6 follows the CCITT T.30, the communication protocol between the FTC 4 and the PSN 1 follows the CCITT X.25, and the communication protocol between the FTC 4 and the DP 2 follows the mail service protocol (MSP). Since the FTC 4 has the facsimile PAD function, the FTC 4 communicates with the PSN 1 and the DP 2 using the same protocol which the G4 facsimile uses when communicating with the PSN 1 and the DP 2.

FIG. 3 shows a block diagram of one embodiment of the facsimile terminal controller (FTC) and a flow of picture data. The FTC 4 comprises a microprocessor (MPU) 7 which stores and processes the picture data, a main memory (MM) 8, a hard disk controller (DKC) 9, a hard disk (DK) 10, a network control unit (NCU) 13 having a telephone switching network controller and a G3 facsimile modem, a facsimile control unit (FCU) 14 having a T.30 protocol and a picture data conversion function, and a line controller (LC) 15 for carrying out the X.25 protocol, all of which are connected through an internal bus 11. The NCU 13 is connected to the telephone switching network 5 through a telephone switching network connection cable 12, and the LC 15 is connected to the pocket switching network 1 through a PCN connection cable 16.

FIG. 4 shows a detail of the facsimile control unit (FCU) 14 and a flow of picture data therein. The FCU 14 comprises a modem control unit (MCU) 17 having a signal serial/parallel conversion function, encoder/decoders (CODEC) 18 and 20, a number of dots per line converter (LNC) 19, a DMA controller (DMAC) 21, a local main memory (LMM) 22, a local microprocessor unit (LMPU) 23 and a bus coupler (BC) 24, all of which are connected through a local bus (L bus) 25.

The operation of the facsimile terminal controller (FTC) 4 is primarily explained. Transmission from the G3 facsimile machine 6 to the DP 2:

a flow of the image data in the FTC 4 is first explained with reference to FIG. 3. The image data 26 received by the protocol of T.30 from the G3 facsimile machine 6 through the telephone switching network 5, connection cable 12 and NCU 13 is code-converted in the FCU 14 and the resolution is converted. Then, it is buffered into the MM 8 8K bytes at a time ( ① ). The picture data in the MM 8 is designated by A. When the picture data A in the MM 8 reaches 8K bytes, or the data terminates, the picture data A is stored in the DK 10 through the DKC 9 ( ② ).

When one sheet of picture data has been stored in the DK 10, the MPU 7 establishes a session with the DP 2 by the X.25 and MSP through the LC 15, and reads out the picture data from the DK 10, 8K bytes at a time, into the MM 8 through the DKC 9 ( (8) ). This picture data is designated by B. Then, the 8K-bytes picture data B is divided into one-packet data (128-4096 bytes), which are sent to the DP 2 through the LC 15 as the picture data 27 ( (4) ). When the MPU 7 receives the acknowledgement of reception from the DP 2, it erases the picture data of the DK 10. The picture data stored in the DP 2 is sent as it is to the G4 facsimile machine 3.

Referring to FIG. 4, the coding algorithm conversion and the resolution conversion in the FCU 14 will be explained. The picture data from the NCU 13 is serial-parallel converted by the MCU 17 and the converted image data is stored in the LMM 22 ( (a) ). This image data is designated by a. The image data a is coded data, which is decoded by the CODEC 18 ( (b) ) and returned to the LMM 22 one line at a time (one line has 1728 dots at 8 pels/mm) ( (c) ). This picture data is designated by b. The decoded picture data b is encoded to MMR by the CODEC 20 ( (d) ) and returned to the LMM 22 ( (e) ). This picture data is designated by d. The picture data d is read from the LMM 22 and transferred to the MM 8 through the BC 24 and the internal bus 11 ( (e') ). Transmission from the DP 2 to the G3 facsimile machine 6:

The flow of picture data in FIG. 3 is completely opposite to the flow in the transmission from the G3 facsimile machine 6 to the DP 2 and the picture data flows in the order of 501(4), (4), (2), (1).

The coding algorithm conversion and the resolution conversion in the FCU 14 of FIG. 4 are also in the opposite order to that in the transmission from the G3 facsimile machine 6 to the DP 2. When the resolution of the G4 facsimile machine 3 is not equal to the standard 200 pels/25.4 mm, the number of dots per line conversion by the LNC 17 may be carried out.

When the resolution of the G4 facsimile 3 is 200 pels/25.4 mm, the picture data flows in the direction of (f), (e), (b), (c) , , , (b), (a) of FIG. 4. The CODEC 20 decodes the picture data and the CODEC 18 encodes the picture data for transmission to the G3 facsimile machine 6.

When the resolution of the G4 facsimile machine 3 is different from the standard resolution, that is, when it is 240 pels/25.4 mm, 300 pels/25.4 mm or 400 pels/25.4 mm, and the picture data of such resolution is transmitted, the coded picture data d stored in the LMM 22 through the BC 24 is decoded by the CODEC 18 ( (e) ), it is returned to the LMM 22 as the picture data c ( (g) ), and it is sent to the LNC 19 to convert it to 8 pels/mm ( (h) ). Then, the 8 pels/mm picture data is returned to the LMM 22 as the picture data b ( (i) ). Then, the flow is in the order of (c), (b), (a) and the picture data is sent to the NCU 13.

Since the resolution 8 pels/mm is the standard specification of the G3/G4 facsimile machines, the processing by the LNC 19 is not necessary for the transmission from the G3 facsimile machine 6 to the DP 2 and the transmission from the DP 2 to the G3 facsimile machine 6. The conversion of the number of lines in the sub-scan direction may be done by deleting lines or adding lines by the software control of the LMPU 23.

Figure 5:
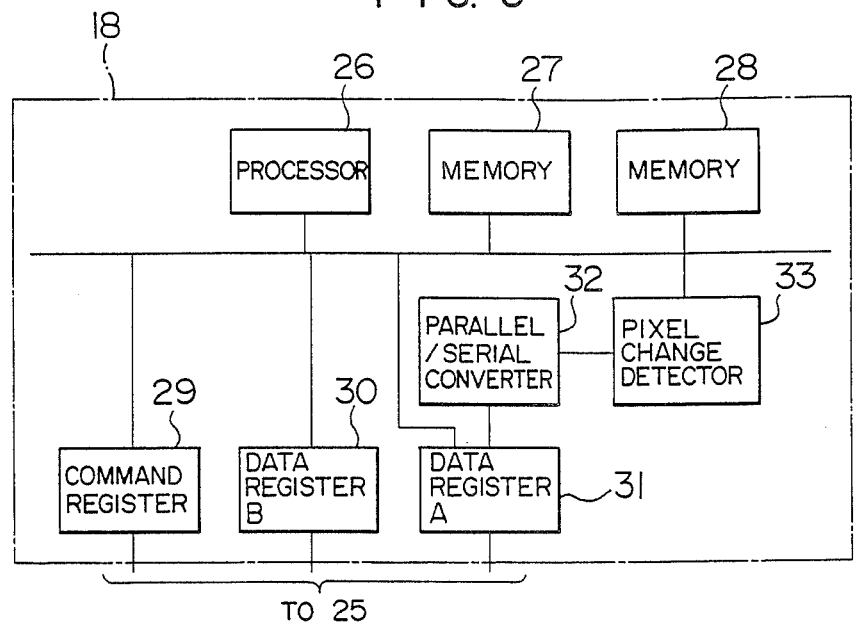
FIG. 5 shows a configuration of an encoder/decoder in the facsimile control unit.

FIG. 5 shows a block diagram of the CODEC 18 in the FCU 14. A processor 26 refers a code table stored in a memory 28 by a microprogram stored in a memory 27 to decode the picture data and process for encoding. A command register 29 stores an encode command or decode command sent from the LMPU 23. A data register A 31 stores the picture data to be decoded or encoded sent from the LMM 22. A data register B 30 stores decoded or encoded data to be sent to the LMM 22. A parallel/serial converter 32 converts parallel data stored in the data register A 31 to serial data for encoding. A pixel change detector 33 detects that pixel of the serial picture data converted by the parallel/serial converter 32 which has changed from "0" (white) to "1" (black) or from "1" to "0".

The decode operation in the CODEC 18 is explained with reference to FIG. 5. When one sheet of image data (a) is stored in the LMM 22, the decode command is sent from the LMPU 23 to the command register 29 of the FCU 14 and one line of picture data (A) is set into the data register A 31. The processor 26 reads out the picture data (a) from the data register A 31 in accordance with the command stored in the command register 29 and processes it in accordance with the microprogram stored in the memory 27, and refers the code table in the memory 28 to decode it by the algorithm of the CCITT Recommendation T.4. The decoded data is set into the data register B 30 and sent to the memory 22 as the picture data (b). The processor 26 erases the synchronization signal contained in the picture data (a) when it decodes the same. It repeats the above operation for each line of picture data.

The encode operation will now be explained. When the picture data (b) is stored in the LMM 22, the encode command is sent from the LMPU 23 to the command register 29 of the FCU 14, and one line of picture data (b) to be encoded is set into the data register A 31. The data set in the data register A 31 is converted to serial data by the parallel/serial converter 32 and supplied to the pixel change detector 33. The processor 26 processes in accordance with the microprogram stored in the memory 27 and the encode command stored in the command register 29, reads the detection result from the pixel change detector 33, and encodes the picture data read from the data register A 31 by the algorithm of the CCITT Recommendation T.4 in accordance with the code table stored in the memory 28. When it encodes, it inserts an EOL signal as a line synchronization signal. The encoded data is set into the data register B 30 and sent to the LMM 22 as the picture data (a). The above operation is repeated for each line of picture data (b).

The configuration of the CODEC 20 is the same as that of the CODEC 18. The components of the CODEC 20 are designated by the same numerals as those of the components of the CODEC 18. The memory 28 stores a code table for decoding and encoding the picture data by the algorithm of the CCITT Recommendation T.6. Like the CODEC 18, the CODEC 20 decodes the picture data (d) stored in the LMM 22 by the algorithm of the CCITT Recommendation T.6 and sends it to the LMM 22 as the picture data (b) or (c), and encodes the picture data (b) stored in the LMM 22 by the algorithm of the CCITT Recommendation T.6 and sends it to the LMM 22 as the picture data (d). Unlike the CODEC 18, no deletion or addition of the line synchronization signal is done during the encoding.

Figure 6:
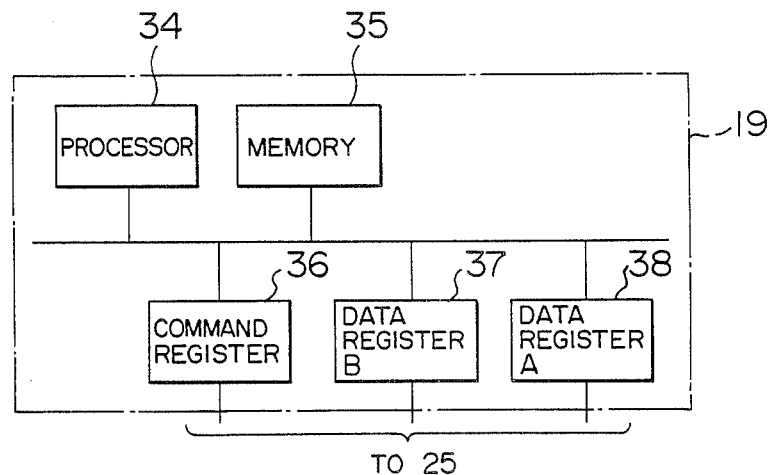
FIG. 6 shows a configuration of a number of dots per line converter in the facsimile control unit.

FIG. 6 shows a block diagram of the number of dots per line converter 19. A processor 34 charges a rate of picture data change in accordance with a program stored in a memory 35. A command to indicate a rate of change of dot number per line of the picture data supplied from the LMPU 23 is set into a command register 36. A data register A 38 stores picture data whose dot number per line is to be changed, and a data register B 37 stores data whose dot number per line has been changed.

In the resolution conversion, the command to indicate the rate of change of dot number per line of the picture data is set from the LMPU 23 into the command register 36. The rate of change of dot number per line is shown in the column of process in the main direction of FIG. 11. As the command is set into the command register 36, one line of image data (c) from the LMM 22 is set into the data register A 38. The processor 34 recognizes the picture data based on the content of the command register 36, and changes the rate of change of dot number per line of the picture data stored in the data register A 38 to a rate of change designated by the content of the command register 36 and sets it into the data register B 37, in accordance with the microprogram stored in the memory 35. The data set in the data register B 37 is sent to the LMM 22 as the image data (b). The above operation is repeated for each line of image data (c).

LMPU 23 carries out deletion or addition of lines, when such conversion of resolution is necessary, by processing the decoded picture data.

The MCU 17, DMAC 21, LMM 22, BC 24 and LMPU 23 in the NCU 14 are configured in the same manner as those of conventional apparatus and detailed explanation thereof is omitted.

FIG. 7 shows an encoding algorithm conversion pattern. In each block, a right top section indicates a process when the FTC 4 sends picture data to a receiving facsimile machine (FTC 4→G3 facsimile machine 6), and a left bottom section indicates a process when the FCU receives the picture data from a sending facsimile machine (G3 facsimile machine 6→FTC 4). MH, MR and MMR are parameters to indicate data compression systems, and the contents of processes (A), (B), (C) and (D) are shown at the bottom of FIG. 7. Since the FTC 4 is not connected to the G4 facsimile machine, the blocks corresponding to the transmission/reception to and from the G4 facsimile machine have symbols "-" which indicate not applicable. As to the parameters MH, MR and MMR, the value of any of such parameters obtained during the protocol process with the G3 facsimile machine 6 is supplied from the LMPU 23 to the CODEC 18 and 20 in the form of a command. Since the picture data from the DP 2 is in MMR, no recognition of the parameter is necessary in the process when communicating with DP 2.

FIG. 8 shows a resolution conversion pattern, or main direction scan line density/sub-direction scan line density conversion pattern. The main direction means a line direction in scanning a sheet, and the sub-direction means a column direction in scanning the sheet, and 8 p/mm means 8 points/mm. Again, in each block, a right top section indicates a resolution conversion process when the image data is sent from the FTC 4 to the G3 facsimile machine 6, and a left bottom section indicates a resolution conversion process when the image data is sent from the G3 facsimile machine 6 to the FTC 4. The contents of the processes (A) to (J) are shown in FIG. 11. When the resolution of the G4 facsimile machine connected to the DP 2 is 240 pels/ 25.4 mm, 300 pels/25.4 mm or 400 pels/25.4 mm, the resolution conversion process when the picture data is sent to the G3 facsimile machine is different from the process when the G4 facsimile machine having a standard resolution of 200 pels/25.4 mm is connected to the DP 2. FIG. 11 shows the resolution conversion processes of the FTC 4 when a document to be sent is the size A4 and the size B4, respectively.

FIG. 9 shows the number of pixels per main direction scan line and ratio for each resolution, and FIG. 10 shows the number (l) of scan lines per mm in the sub-scan direction and ratio for each resolution. In the processes (A) to (J) of FIG. 11, the main direction relates to the conversion of the number of pixels per scan line, and the sub-direction relates to the conversion of the number of scan lines per mm. The remarks in FIG. 11 indicate the resolution conversions when the picture data is received from the facsimile machine having the resolution shown in the remark column, and when the picture data is sent to such a facsimile machine.

While particular embodiments of the invention have been shown and described, it will be obvious to those skilled in the art that various changes and modifications may be made without departing from the present invention in its broader aspects.

I claim:

1. A facsimile communication system for communicating picture data among facsimile machines comprising:
   at least one second facsimile machine for sending and receiving picture;
   at least one second facsimile machine other than a G4 facsimile machine for sending and receiving picture data; and
   a facsimile terminal controller connected to said second facsimile machine through a network, other than a store and forward switching network and connected to said G4 facsimile machine through a store and forward switching network for converting picture data of a second facsimile standard received from said second facsimile machine into picture data of a G4 facsimile standard and sending the converted picture data to said G4 facsimile machine and for converting picture data of a G4 facsimile standard received from said G4 facsimile machine into picture data of said second facsimile standard and sending the converted picture data to said second facsimile machine.

2. A facsimile communication system according to claim 1, wherein said second facsimile machine is a G3 facsimile machine.

3. A facsimile communication system according to claim 1, wherein said network other than a store and forward switching network is a telephone switching network.

4. A facsimile communications system according to claim 1, wherein said store and forward switching network connected between said G4 facsimile machine and said facsimile terminal controller stores and sends converted picture data between said G4 facsimile machine and said facsimile terminal controller using an X.25 communication protocol.

5. A facsimile communication system according to claim 1, wherein said facsimile terminal controller includes a first converter for converting picture data of said second facsimile standard received from said second facsimile machine into picture data of said G4 facsimile standard, and a second converter for converting picture data of said G4 facsimile standard received from said G4 facsimile machine into picture data of said second facsimile standard.

6. A facsimile communication apparatus according to claim 5, wherein said facsimile terminal controller has a memory for storing picture data, and said first and second converters convert each line of one sheet of picture data.

7. A facsimile communication system according to claim 5, wherein said first converter decodes said picture data of said second facsimile standard and encodes said decoded picture data into picture data of said G4 facsimile standard and said second converter decodes said picture data of said G4 facsimile standard and encodes said decoded picture data into picture data of said second facsimile standard.

8. A facsimile communication system for communicating picture data among facsimile machines comprising:
 at least one G4 facsimile machine for sending and receiving picture data;
 at least one second facsimile machine other than a G4 facsimile machine for sending and receiving picture data; and
 a facsimile terminal controller connected to the second facsimile machine through a network other than a store and forward switching network and connected to said G4 facsimile machine through a store and forward switching network for converting the resolution of picture data received from said second facsimile machine, from a second resolution standard into a G4 resolution standard, and sending the converted picture data to said G4 facsimile machine and for converting the resolution of picture data received from said G4 facsimile machine, from a G4 resolution standard into said second resolution standard and sending the converted picture data to said second facsimile machine.

9. A facsimile communication system according to claim 8, wherein said second facsimile machine is a G3 facsimile machine.

10. A facsimile communicating system according to claim 8, wherein said network other than a store and forward switching network is a telephone switching network.

11. A facsimile communication system according to claim 8, wherein said facsimile terminal controller converts the resolution of the picture data received from said first G4 facsimile machine after having decoded the picture data, and converts the resolution of the picture data received from said second facsimile machine after having decoded the picture data.

12. A facsimile communication system according to claim 11, wherein the conversion of resolution includes conversion of a number of dots in a line in a main scan direction and any of deletion and addition of line in sub-scan direction.

* * * * *